United States Patent [19]

Thornton et al.

[11] Patent Number: 4,633,153

[45] Date of Patent: Dec. 30, 1986

[54] POWER WINDOW CONTROL WITH TAPE DRIVE TENSION RELEASE

[75] Inventors: Dennis P. Thornton; John S. Maceross, both of Centerville; Jeff A. Foust, Farmersville; Keith R. Cook, Beavercreek, all of Ohio

[73] Assignee: General Motors Corporation, Detroit, Mich.

[21] Appl. No.: 832,439

[22] Filed: Feb. 24, 1986

[51] Int. Cl.$^{4}$ ........................ H02P 1/22

[52] U.S. Cl. ........................ 318/280; 318/266; 318/282; 318/626

[58] Field of Search ............... 318/280, 282, 266, 267, 318/6, 626

[56] References Cited

U.S. PATENT DOCUMENTS

| | | | |
|---|---|---|---|
| 3,588,652 | 6/1971 | Lewis | 318/282 |
| 3,733,532 | 5/1973 | Hill | 318/266 |
| 3,891,909 | 6/1975 | Newson | 318/282 X |
| 4,065,707 | 12/1977 | Becker | 318/280 |
| 4,203,057 | 5/1980 | Totsu | 318/285 |
| 4,246,520 | 1/1981 | Giles | 318/280 |
| 4,284,935 | 8/1981 | March et al. | 318/280 |

*Primary Examiner*—B. Dobeck

*Attorney, Agent, or Firm*—Robert M. Sigler

[57] ABSTRACT

Motor control apparatus is disclosed for a motor driven vehicle power window mechanism including a flexible drive element, such as a drive tape, adapted to drive the window in a predetermined direction by being placed in tension by the motor. The tension of the flexible drive element is relieved by automatically reversing motor direction for a short time when the window reaches the desired position. The reverse motor rotation is accurately controlled to an amount sufficient to relieve drive tension but insufficient to produce unwanted reverse movement of the window by detecting the pulses of the armature ripple current as the successive commutator bars pass the brushes during reverse motor rotation, integrating these pulses and stopping the reverse motor operation when the integrated value reaches a predetermined reference.

2 Claims, 1 Drawing Figure

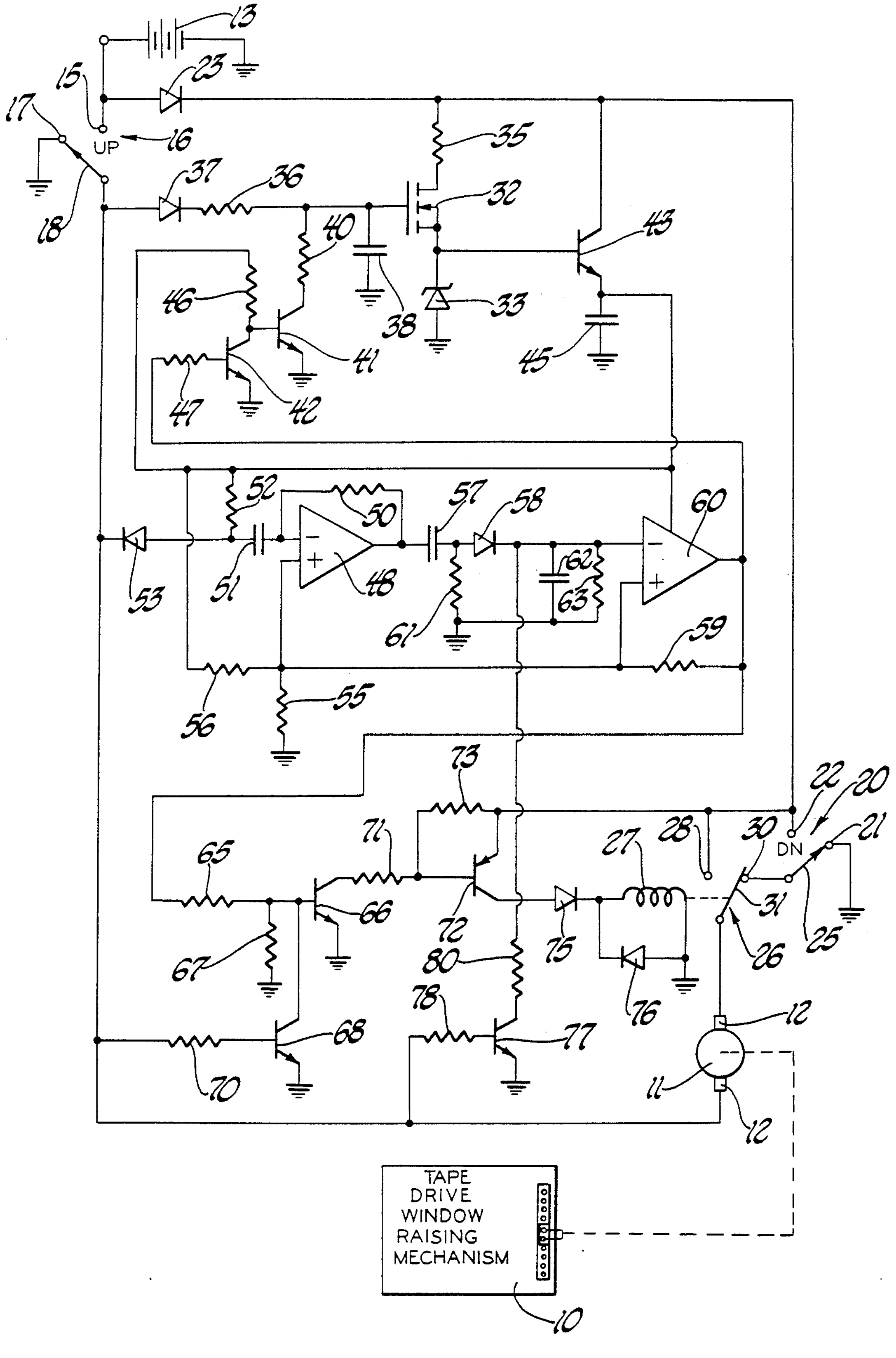
13
23
15
17
UP
16
18
37
36
35
32
40
43
46
41
38
33
45
47
42
52
57
58
60
50
53
51
48
62
63
61
59
56
55
73
22
20
21
71
27
28
30
DN
65
66
72
31
75
26
25
67
80
76
78
77
12
68
70
11
12
TAPE
DRIVE
WINDOW
RAISING
MECHANISM
10

POWER WINDOW CONTROL WITH TAPE DRIVE TENSION RELEASE

BACKGROUND OF THE INVENTION

This invention relates to a power window control for a motor vehicle and particularly to a control for a power window drive including a flexible drive element between the drive motor and window. An example of a flexible drive element is the drive tape used in some power window mechanisms used on vehicles sold by the assignee of this patent. The flexible drive element is placed in tension as the motor moves the window up or down. When the window reaches its full up or down position it stops and stalls the motor. The motor is then deactivated; but, if no means are provided for releasing the tension of the flexible drive element, it will remain in tension essentially all the time. It would be advantageous in increasing the reliability and useful life of the flexible drive element to provide tension relieving means in the motor control.

Tension relieving means for drive elements are known in the prior art. For example, the U.S. patent to Giles III, U.S. Pat. No. 4,246,520, issued Jan. 20, 1981 shows a vehicle power seat control in which the drive motor is automatically reversed for a predetermined time when operation is stopped in order to relieve pressure on the gear train and thus prevent a locked rotor condition. In addition, the U.S. patent to Comeau, U.S. Pat. No. 4,471,275, issued Sept. 11, 1984, shows a drapery closure control in which the drive motor is reversed for a predetermined time before stopping in order to relieve tension on the draw cords. In each of these controls the time duration of motor reversal is a constant predetermined duration, set by an RC time delay circuit. However, the constant predetermined duration of motor reversal, when applied to a vehicle power window drive, might produce a variable degree of reverse movement under different environmental and electrical operating conditions. It is desired that such a control, particularly in the window closing operation, always produce just enough reverse movement to relieve the tension in the drive elements but not enough to move the window itself away from its tightly closed position.

SUMMARY OF THE INVENTION

Therefore, this invention provides a vehicle power window control which reverses the drive motor after the cessation of movement in the desired direction to produce a predetermined reverse motor movement, regardless of time duration. This is accomplished by detecting pulses of the motor ripple current during reverse motor movement and integrating these pulses up to a predetermined value.

In particular, this invention is a motor control apparatus for a motor driven vehicle power window mechanism including a flexible drive element and comprises an electric power source, an operator controlled switch having first and second operative conditions and being effective, only while in the first operative condition, to connect the electric power source to the motor for activation thereof in a first direction to drive the window, through the flexible drive element in tension, in the predetermined direction, an electrically controlled switch having activated and deactivated conditions and being normally in the deactivated condition, the electrically controlled switch, when in its activated condition, being effective to connect the electric power source to the motor in reverse for activation thereof in a second direction and thus relieve the tension of the flexible drive element, and circuit means responsive to movement of the operator controlled switch to its second operative condition following a predetermined duration thereof in its first operative condition to detect pulses of the ripple in the motor operating current and integrate these pulses to produce an output voltage therefrom generally proportional to motor rotation, to provide continuous maintenance of the electrically controlled switch in its activated condition during the integration and to switch the electrically controlled switch to its deactivated condition when the output voltage reaches a predetermined level, whereby the motor may be reliably driven in the reverse direction by an amount sufficient to relieve drive tension but insufficient to produce unwanted reverse movement of the window.

Further details and advantages of this invention will be apparent from the accompanying drawing and following description of a preferred embodiment.

DESCRIPTION OF A PREFERRED EMBODIMENT

The single FIGURE shows, schematically, a vehicle window drive mechanism 10 including a flexible drive element such as a tape drive. Such drive mechanisms are known in the art and shown in patents such as Kazewych U.S. Pat. No. 4,335,541, issued June 22, 1982, Campbell et al U.S. Pat. No. 4,253,277, issued Mar. 3, 1981, Breaz et al U.S. Pat. No. 4,246,726, issued Jan. 27, 1981 and Podolan et al 4,241,542, issued Dec. 30, 1980. The drive mechanism is actuated to move the window by a reversible DC motor 11 of the standard type including a commutator with brushes 12 in the armature circuit. A DC electric power source such as battery 13, which represents the vehicle DC power system, has a grounded terminal and further has an ungrounded terminal connected to a first contact 15 of a UP switch 16. Another contact 17 of switch 16 is grounded; and the armature 18 of switch 16 is normally spring loaded against contact 17 as shown but activatable to a position against contact 15 against the spring loading by the vehicle operator.

DN switch 20 includes a grounded contact 21 and a contact 22 connected to the cathode of a diode 23 (1N4004) having an anode connected to contact 15 of switch 16. Switch 20 further has an armature 25 normally in the position shown contacting contact 21 but is activatable by the vehicle operator to another position in which it contacts contact 22. In addition, an electrically controlled switch or relay 26 includes an actuating coil 27, a normally open contact 28 connected to contact 22, a normally closed contact 30 connected to armature 25 of switch 20 and an armature 31, which contacts normally closed contact 30 when coil 27 is deactivated and normally open contact 28 when coil 27 is activated.

The armature circuit of motor 11, including brushes 12, is connected between armature 18 of UP switch 16 and armature 31 of relay 26. In the position shown, both of brushes 12 are grounded; and there is thus no armature current. UP switch 16 and DN switch 20 are operator controlled switches used to cause movement of the window upward and downward, respectively. They generally include actuator buttons mechanically combined in such a way that either one or the other may be actuated, but not both simultaneously. An example is a rocker mechanism spring loaded to a central position but activatable in either of two opposite directions. The vehicle operator may initiate upward movement of the window, if the window is not fully closed, by activating switch 16 to close a current path from battery 13 through switch 16, motor 11, relay armature 31 and switch 20 to ground. Alternatively, he may initiate downward movement of the window, if it is not fully open, by activating switch 20 to close a current path from battery 13 through diode 23, switch 20, relay armature 31, motor 11 and switch 16 to ground. With the exception of relay 26 and diode 23, the circuit to this point is generally conventional.

The remainder of the circuit shown controls the motor reversal. In this embodiment, it is shown only for upward or closing window movement; but it is understood that it could also easily be applied to downward or opening window movement.

A power supply section of the circuit forms the top third thereof. A FET 32 (2VN1408) has a source connected through a Zener diode 33 (1N4735) to ground, a drain connected through a resistor 35 (1K) to the cathode of diode 23 and a gate connected through a resistor 36 (100) to the cathode of a diode 37 (1N4004) having an anode connected to armature 18 of switch 16. The gate of FET 32 is further connected through a capacitor 38 (0.1 mF) to ground and through a resistor 40 (4.7K) to the collector of a bipolar NPN transistor 41 (MPSA14), which has a grounded emitter. Transistor 41 further has a base connected to the collector of a similar bipolar NPN transistor 42 having a grounded emitter. The source of FET 32 is further connected to the base of a bipolar NPN transistor 43 (MPSA06) having a collector connected to the cathode of diode 23 and an emitter connected through a capacitor 45 (10 mF) to ground. The emitter of transistor 43 is further connected through a resistor 46 (47K) to the base of transistor 41. A resistor 47 (100 K) connected to the base of transistor 42 completes the power supply group of circuit elements. FET 32 and transistor 43 form an electronic switch adapted to control activation of a ripple current sensor to be described below. Diode 37, resistor 36 and capacitor 38 form a capacitive holding circuit adapted to hold on FET 32 and transistor 43 when switch 16 is released; while transistors 41 and 42 form an electronic switch controlling a discharge circuit for capacitor 38.

A second group of elements, occupying the middle third of the circuit beneath the power supply elements, comprises a ripple current sensor. An operational amplifier or op amp 48 has an output connected in negative feedback through a resistor 50 (1M) to its inverting input, which is also connected to one side of a capacitor 51 (0.01 mF). The other side of capacitor 51 is connected through a resistor 52 (100K) to the emitter of transistor 43 and, in parallel, to the anode of a diode 53 (1N4004) having a cathode connected to armature 18 of switch 16. The non-inverting input of op amp 48 is connected through a resistor 55 (10K) to ground and, in parallel, through another resistor 56 (30K) to the emitter of transistor 43. Diode 53 is a ripple current detector for the armature circuit of motor 11. Op amp 48 is an amplifier for the detected ripple pulses.

The output of op amp 48 is connected through a capacitor 57 (0.47 mF) to the anode of a diode 58 (1N4004) having a cathode connected to the inverting input of an op amp 60. The anode of diode 58 is further connected through a resistor 61 (10K) to ground; and the cathode of diode 58 is connected through a parallel capacitor 62 (0.047 mF) and resistor 63 (500K) to ground. The non-inverting input of op amp 60 is connected to the non-inverting input of op amp 48. The output of op amp 60 is connected through resistor 47 to the base of transistor 42 and, in parallel, through a resistor 59 (1M) to the non-inverting input thereof. Op amps 48 and 60 may be a pair in the same chip having a common positive power supply activating terminal; and this terminal is connected to the emitter of transistor 43 so that transistor 43 determines whether or not op amps 48 and 60 are in an operational condition. Capacitor 62 is an integrator for the detected and amplified ripple pulses from op amp 48; and op amp 60 is connected with positive feedback to compare the integral voltage on capacitor 62 with a predetermined reference voltage at the junction of resistors 55 and 56 and indicate which is larger.

The third group of elements occupies the lower third of the circuit and forms the switch that controls reverse operation of the motor for tension release, subject to the control of the other groups of elements. The output of op amp 60 is connected through a resistor 65 (100K) to the base of a bipolar NPN transistor 66 (MPSA14), the emitter of which is grounded. The base of transistor 66 is connected through a resistor 67 (100K) to ground and is further connected in parallel to the collector of a bipolar NPN transistor 68 (MPSA06) having a grounded emitter and a base connected through a resistor 70 (100K) to armature 18 of switch 16. The collector of transistor 66 is connected through a resistor 71 (1K) to the base of a bipolar PNP transistor 72 (MPSA56) having an emitter connected to the cathode of diode 23 and, in parallel, through a resistor 73 (470) to its own base. Transistor 72 further has a collector connected to the anode of a diode 75 (1N4004), the cathode of which is connected through coil 27 of relay 26 to ground. The cathode of diode 75 is further connected to the cathode of a diode 76 (1N4004), the anode of which is grounded. Finally, a bipolar NPN transistor 77 (MPSA06) has a grounded emitter, a base connected through a resistor 78 (100K) to armature 18 of switch 16 and a collector connected through a resistor 80 (1K) to the inverting input of op amp 60. Transistors 66, 68 and 72 form an electronic switch controlling the activation of relay 26 in response to the condition of switch 16 and the output of op amp 60. Transistor 77 is a hold down switch which, when activated, prevents the charging of capacitor 62 and thus the integrating of the detected ripple pulses.

In operation, the vehicle operator activates UP switch 16 to initiate motor operation in the window up direction as already described. Positive battery voltage is now applied through switch 16 to the gate of FET 32, which turns on to allow current flow from battery 13 through diode 23, resistor 35, FET 32 and Zener diode 33 to ground. Zener diode 33 ensures a voltage on the base of transistor 43 sufficient to turn it on. The emitter of transistor 43 pulls up to the supply voltage and provides electrical power to op amps 60 and 48 and a high voltage through resistor 46 to the base of transistor 41. Transistor 77 is turned on through switch 16 and holds down the inverting input of op amp 60. The output of op amp 60 thus goes high and turns on transistor 42, which holds off transistor 41. Therefore, capacitor 38 quickly charges through resistor 36 to substantially battery voltage and remains charged. Transistor 68 is turned on through switch 16 and holds off transistors 66 and 72 to deactivate relay 26.

This situation continues until the operator discontinues holding the actuator of switch 16 and armature 18 once again grounds against contact 17. Transistors 68 and 77 are turned off as their bases are grounded, thus freeing transistor 66 and the inverting input of op amp 60. Diode 37 and the still turned off transistor 41, however, prevent the discharge of capacitor 38; and FET 32 thus remains in a conducting condition to continue supplying power through transistor 43 to the op amps 48 and 60 in the ripple sensing circuitry. The high output of op amp 60 remains and turns on transistor 66. This, plus the high voltage from diode 23, turns on transistor 72 and provides current through relay coil 27. This causes relay armature 31 to actuate to contact 28 and reverse the current flow through motor 11 to the now grounded switch 16.

As the armature of motor 11 turns in the reverse direction, a ripple occurs in the armature current with each commutator bar that passes the brushes 12. This ripple is rectified to a series of pulses by diode 53 and amplified by op amp 48 with feedback resistor 50. The amplified pulses are integrated by capacitor 62, the output voltage of which is applied to the inverting input of op amp 60. When the number of pulses, and therefore the number of commutator bars of motor 11, has increased sufficiently that the voltage at the inverting input of op amp 60 exceeds the constant predetermined voltage at the non-inverting input, the op amp 60 output switches low. This causes transistors 66 and 72 to turn off and coil 27 to release armature 31. Motor 11 thus stops with both sides of the armature winding grounded. transistor 42 also turns off and allows transistor 41 to turn on and discharge capacitor 38. This turns off FET 32 and transistor 43 and removes power from op amps 48 and 60. The window mechanism rests with tension relaxed in the flexible drive member until the next actuation of the system by the UP or DN switch, whichever is appropriate.

The embodiments of the invention in which an exclusive property or privilege is claimed are defined as follows:

1. Motor control apparatus for a motor driven vehicle power window mechanism including a flexible drive element adapted to drive the window in a predetermined direction by being placed in tension by the motor, the motor being of the type having a commutator and producing a detectable ripple in its operating current as the successive commutator bars pass the brushes during motor rotation, the motor control apparatus comprising, in combination:

an electric power source;

an operator controlled switch having first and second operative conditions and being effective, only while in the first operative condition, to connect the electric power source to the motor for activation thereof in a first direction to drive the window, through the flexible drive element in tension, in the predetermined direction;

an electrically controlled switch having activated and deactivated conditions and being normally in the deactivated condition, the electrically controlled switch, when in its activated condition, being effective to connect the electric power source to the motor in reverse for activation thereof in a second direction and thus relieve the tension of the flexible drive element;

circuit means responsive to movement of the operator controlled switch to its second operative condition following a predetermined duration thereof in its first operative condition to detect pulses of the ripple in the motor operating current and integrate these pulses to produce an output voltage therefrom generally proportional to motor rotation, to provide continuous maintenance of the electrically controlled switch in its activated condition during the integration and to switch the electrically controlled switch to its deactivated condition when the output voltage reaches a predetermined level, whereby the motor may be reliably driven in the reverse direction by an amount sufficient to relieve drive tension but insufficient to produce unwanted reverse movement of the window.

2. Motor control apparatus for a motor driven vehicle power window mechanism including a flexible drive element adapted to drive the window in a predetermined direction by being placed in tension by the motor, the motor being of the type having a commutator and producing a detectable ripple in its operating current as the successive commutator bars pass the brushes during motor rotation, the motor control apparatus comprising, in combination:

an electric power source having grounded and ungrounded terminals;

an operator controlled switch having a movable armature, a first contact connected to the ungrounded terminal of the electric power source and a second contact connected to the grounded terminal of the electric power source, the armature being mechanically biased to the first contact;

a relay having a normally open contact connected to the ungrounded terminal of the electric power source, a normally closed contact connected to the grounded terminal of the electric power source, an armature connected through the motor armature circuit to the armature of the operator controlled switch and an actuating coil;

an amplifier having an input connected through a diode to the armature of the operator controlled switch and one commutator brush of the motor armature circuit, the amplifier being effective to detect and amplify the ripple in the operating current of the motor;

a capacitive integrating circuit connected to the output of the amplfier and effective to integrate the output thereof by charging to an integral voltage;

a comparator having a first input supplied with a reference voltage, a second input connected to receive the integral voltage and an activating terminal, the comparator being effective, when activated by means of the activating terminal, to compare the voltages on the first and second inputs thereof;

a first electronic switch having a control terminal connected to the armature of the first switch and main current carrying terminals connected between the second input of the comparator and the grounded terminal of the electric power source, the first electronic switch being effective to prevent charging of the capacitive integrating circuit when the operator controlled switch is activated;

a second electronic switch having a control terminal connected to the armature of the operator controlled switch and main current carrying terminals connected to provide operating power, when activated, from the electric power source to the activating terminal of the comparator;

a capacitive holding circuit including a capacitor charged through the armature of the activated operator controlled switch and diode means effective to prevent discharge through the deactivated operator controlled switch, the capacitive holding circuit being connected to the control terminal of the second electronic switch and effective, when the capacitor is charged, to hold that switch on;

a third electronic switch having a first control electrode connected to the activating terminal of the comparator, a second control terminal connected to the output of the comparator and main current carrying terminals effective to provide a discharge current path for the capacitor of the capacitive holding circuit when the comparator is activated and produces an output indicative of an integral voltage greater than the reference;

a fourth electronic switch having a first control terminal connected to the output of the comparator, a second control terminal connected to the armature of the operator controlled switch and main current carrying terminals connected in series with the electric power source and the relay coil, the fourth electronic switch being effective, when the comparator signifies an integral voltage greater than the reference voltage and the operator controlled switch is not actuated, to actuate the relay and thus cause motor rotation in the reverse direction.

* * * * *